UNITED STATES PATENT OFFICE.

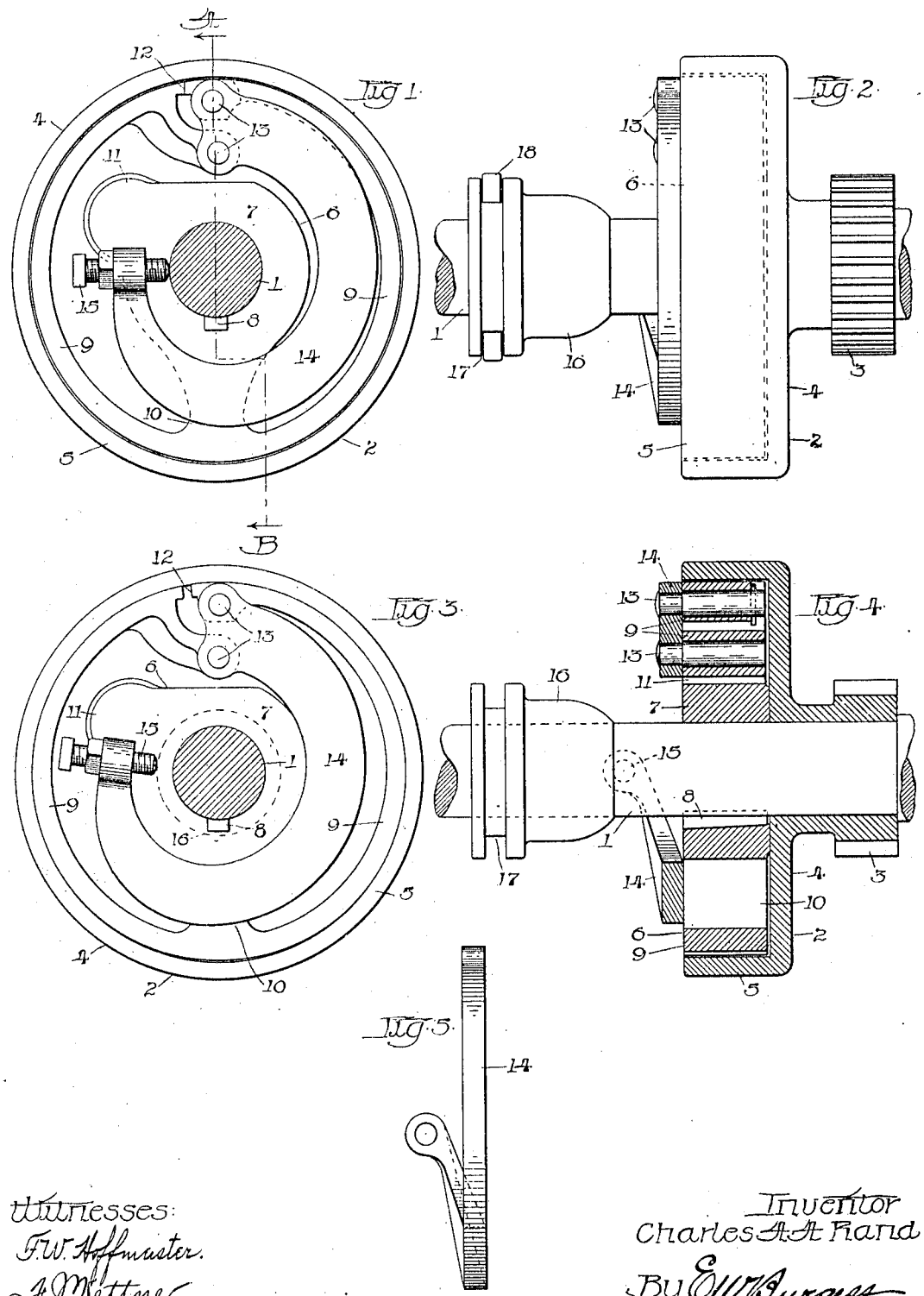

CHARLES A. A. RAND, OF CHICAGO, ILLINOIS, ASSIGNOR TO INTERNATIONAL HARVESTER COMPANY, A CORPORATION OF NEW JERSEY.

FRICTION-CLUTCH.

947,351.  Specification of Letters Patent.  Patented Jan. 25, 1910.

Application filed March 31, 1909. Serial No. 486,970.

*To all whom it may concern:*

Be it known that I, CHARLES A. A. RAND, a citizen of the United States, residing at Chicago, in the county of Cook and State of Illinois, have invented certain new and useful Improvements in Friction-Clutches, of which the following is a specification.

My invention relates to friction clutches of the type commonly called split ring, and consists in providing means for neutralizing the effect of centrifugal force in causing the operative parts to prematurely engage, its object being to provide a mechanism that will be simple and strong in construction and efficient in operation. I attain these objects by means of the mechanism illustrated in the accompanying drawing, in which—

Figure 1 is a plan view of part of the mechanism, showing the split ring portion of the clutch in its relaxed position within the annular coacting rim portion and the actuating lever operatively connected therewith; Fig. 2 is a side elevation of Fig. 1, showing the clutch controlling means; Fig. 3 is a plan view of the mechanism, showing the split ring in its expanded position; Fig. 4 is a cross section of Fig. 1, along the line A—B thereof; and Fig. 5 is a detail drawing representing a side elevation of the clutch actuating lever.

Like reference characters designate the same parts throughout the several views.

1 is a shaft having loosely mounted thereon a clutch member 2, and integral with the clutch member is a pinion 3 designed to transmit motion to any part of the machine as desired, the clutch member being provided with a web portion 4 and an annular rim portion 5 projecting laterally from the face of the web.

6 is a complemental clutch member including a hub portion 7 secured to the shaft by means of a key 8. A ring portion 9 is connected with the hub by means of an arm 10 and a counterbalancing portion 11 projecting radially from said hub. The ring portion is cut through at 12, and the adjacent ends are provided with transverse openings in line with the axis of the shaft and approximately in a diametrical line passing through its axis, the openings being adapted to receive pins 13 that extend outward from the face of the ring and have secured thereto one end of a clutch controlling lever 14 that partially encircles the shaft, extending approximately three-fourths of the distance around it, and its opposite end upturned laterally upward and provided with a radial opening adapted to receive an adjusting screw 15, that portion of the lever upon the side opposite to the screw on a line passing through the axis of the shaft and the pins 13 having a greater weight than the portion upon the side receiving the screw, whereby centrifugal force will be operative to cause the heavier portion of the lever to swing outward in a manner to contract the clutch ring.

16 represents a clutch controlling cone slidably mounted upon the shaft and adapted to engage with the inner end of the screw and provided with an annular groove 17 adapted to receive a common form of clutch shipping fork, represented by 18. When the clutch controlling cone is moved into engagement with the screw it causes the inner end of the lever to move away from the axis of the shaft, and its outer end, through its connection with the adjacent ends of the ring, will cause the latter to separate in a manner to force the periphery of the ring in contact with the rim 5.

In the operation of this type of clutch in connection with rapidly moving parts as heretofore constructed, centrifugal force would cause the controlling lever to move in a direction to expand the clutch ring and thereby cause it to engage with its complemental clutch member in a manner to produce premature motion of the operative parts thereof and disturb the proper action of the machine with which those parts were connected. By means of my invention this evil is removed, as any movement of the lever, due to centrifugal force, will operate to swing its inner end inward toward the shaft and, through the connections of its outer end with the adjacent ends of the split ring, cause them to approach each other in a manner to contract the ring and prevent it from engaging with the surface of the complemental clutch member.

What I claim as my invention, and desire to secure by Letters Patent, is:

A frictional clutch including, in combination, a shaft, a clutch member secured to said shaft, a complemental clutch member loosely mounted upon said shaft, a split ring forming part of said fixed clutch member, a friction rim forming part of said loose clutch member, means for controlling the expansion or contraction of said split ring, said means including a lever having one end connected with adjacent ends of said split ring at points approximately in a diametrical line and passing through the axis of said shaft in a manner to cause said ring to operatively engage with said rim when said lever is moved in one direction and to contract it when moved in an opposite direction, said lever partially encircling said shaft and having its opposite end provided with an adjustable screw radially arranged relative to the axis of the shaft, a clutch controlling cone slidably mounted upon said shaft and adapted to engage with said screw in a manner to move the lever in a direction to expand the clutch in opposition to centrifugal force.

CHARLES A. A. RAND.

Witnesses:
 LYNN MAE COLLINS,
 E. W. BURGESS.